Figure 1:
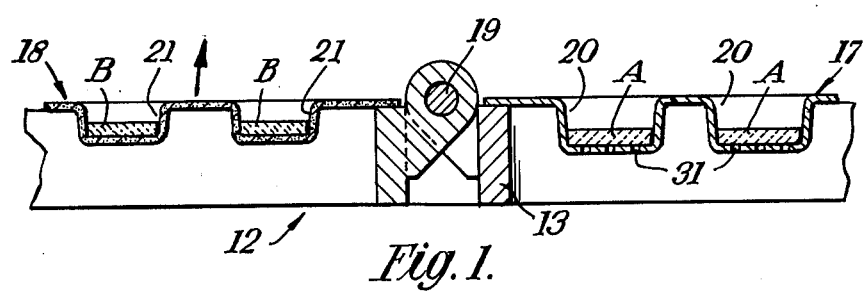

United States Patent [19]

Steels

[11] 3,940,218

[45] Feb. 24, 1976

[54] APPARATUS FOR THE MANUFACTURE OF CONFECTIONERY MADE OF PLURAL MATERIALS

[75] Inventor: Gordon Steels, Peterborough, England

[73] Assignee: Baker Perkins Holdings Limited, England

[22] Filed: July 3, 1974

[21] Appl. No.: 485,591

[52] U.S. Cl. ................ 425/112; 425/261; 425/134; 425/120
[51] Int. Cl.² ...................... A23G 3/22; A23G 3/12
[58] Field of Search ........... 425/134, 257, 261, 112, 425/120; 99/450.6, 427, 450.1, 450.3, 450.4

[56] References Cited
UNITED STATES PATENTS

| | | | |
|---|---|---|---|
| 1,475,579 | 11/1923 | Harlan | 425/134 |
| 1,775,597 | 9/1930 | Myers et al. | 425/134 |
| 2,487,417 | 11/1949 | Bianchi | 425/112 X |
| 2,855,867 | 10/1958 | Zeitlin | 99/450.6 |
| 3,782,269 | 1/1974 | Latham et al. | 99/427 |
| 3,782,270 | 1/1974 | Sollerud | 99/450.4 |

FOREIGN PATENTS OR APPLICATIONS 1,021,675    3/1966    United Kingdom ................ 425/134

Primary Examiner—J. Howard Flint, Jr.
Assistant Examiner—David S. Safran
Attorney, Agent, or Firm—Watson, Cole, Grindle & Watson

[57] ABSTRACT

Apparatus for moulding confectionery, comprising a series of moulds, each of which is divided into a fixed half and a hinged half which is normally aligned with the fixed half, a conveyor for traversing the moulds in sequence past a filling station, through a cooling zone to a discharge station and back to the filling station, a depositor at the filling station which is arranged to deposit different materials into moulding cavities in each half of each mould, mechanism disposed at a folding station beyond the cooling zone for folding the hinged half of each mould about its hinge against the fixed half and effecting deposition of the contents of the moulding cavities thereof into the moulding cavities of the fixed half, mechanism disposed at a following unfolding station for returning the folded hinged half of each mould into alignment with its fixed half, and means for inverting the moulds prior to arrival at the discharge station and turning them right way up during their return to the filling station.

6 Claims, 11 Drawing Figures

APPARATUS FOR THE MANUFACTURE OF CONFECTIONERY MADE OF PLURAL MATERIALS

This invention relates to apparatus for moulding confectionery of the kind, hereinafter termed the kind specified, comprising a conveyor for traversing moulds, each having a number of moulding cavities, in a continuous procession and in sequence past a filling station, at which the mould cavities are filled with confectionery by a moving head depositor, through a cooling zone to a discharge station and back to the filling station, the moulds being inverted before they reach the discharge station and turned right way up during their return to the filling station. In the case of soft fondant the confectionery may be discharged from the mould cavities by blowing air through holes in the bases of the cavities as described in British Specification No.1050699. In the case of hard fondant the moulds may be made of elastic material and subjected to tapping or deformation at the discharge station to facilitate discharge of the fondants as described in British Specification No.1005674.

It is possible with such apparatus to deposit two different materials into each mould cavity from the moving head depositor, the two deposits being made successively or simultaneously. Thus simultaneous deposition may be made from concentric nozzles, one of which is annular and surrounds the other. While deposition of two different materials from a common depositor into the same mould cavities permits of production of a confection with a liquid filling, such as jam, in a cream shell there is considerable restriction in regard to compatability of the two materials. Thus they cannot differ materially in terms of density.

The invention provides an apparatus of the above specified kind in which each mould is divided into a fixed half and a hinged half which is normally aligned with the fixed half, in which the depositor is arranged to deposit different materials in the moulding cavities of each mould half, and which includes, at a folding station disposed beyond the cooling zone, mechanism for folding the hinged half of each mould about its hinge against the fixed half and effecting deposition of the contents of the moulding cavities of the hinged half into the moulding cavities of the fixed half and, at a following unfolding station, mechanism for returning the folded hinged half of each mould into its normal position of alignment with the fixed half.

Figure 3:
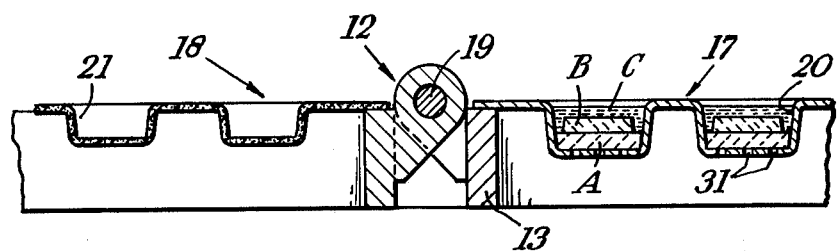
Figure 4:
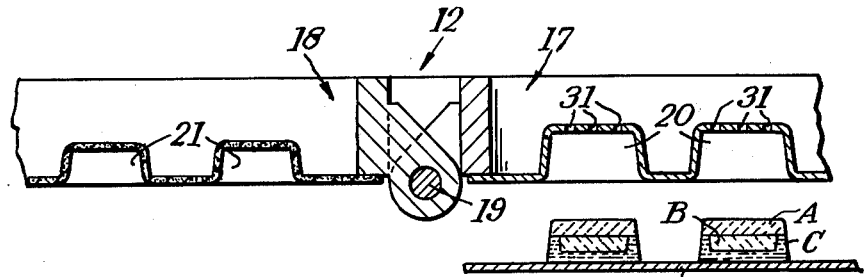
Figure 5:
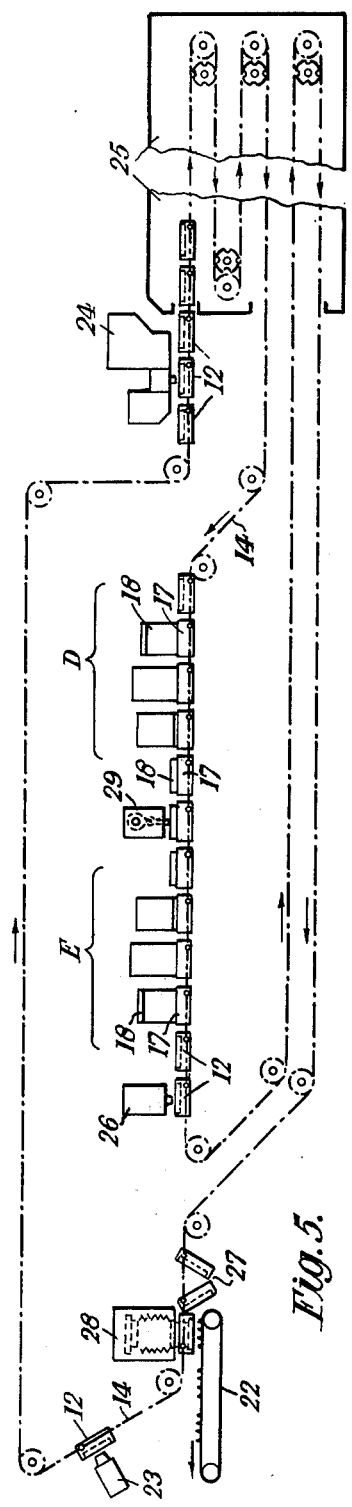
Figure 6:
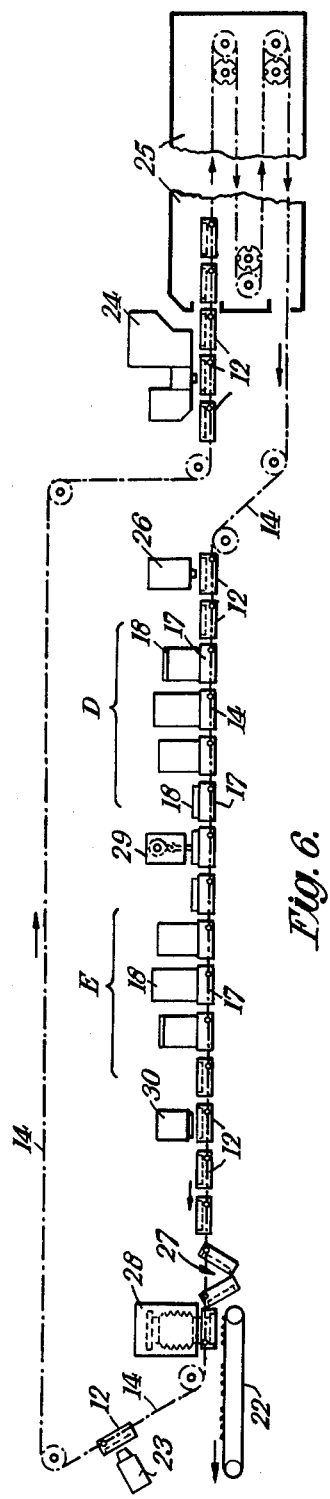
Figure 7:
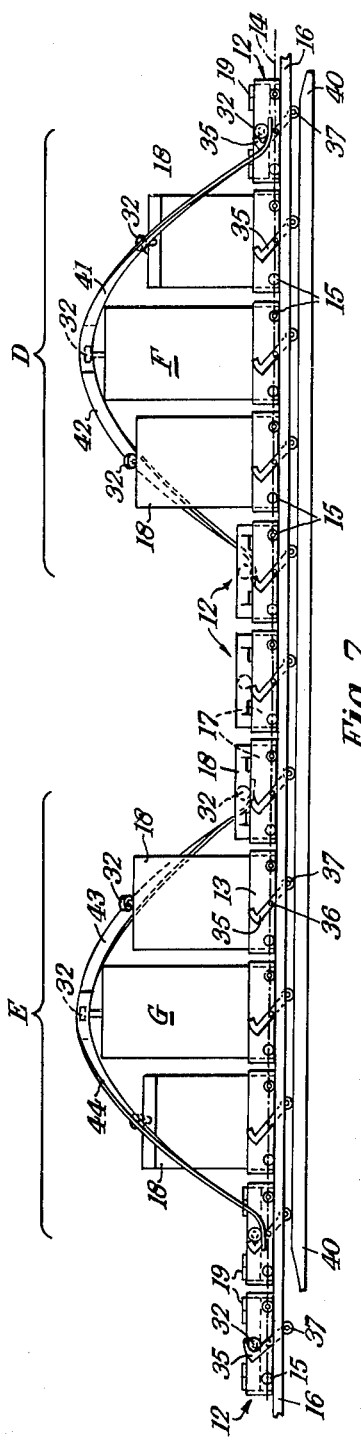
Figure 8:
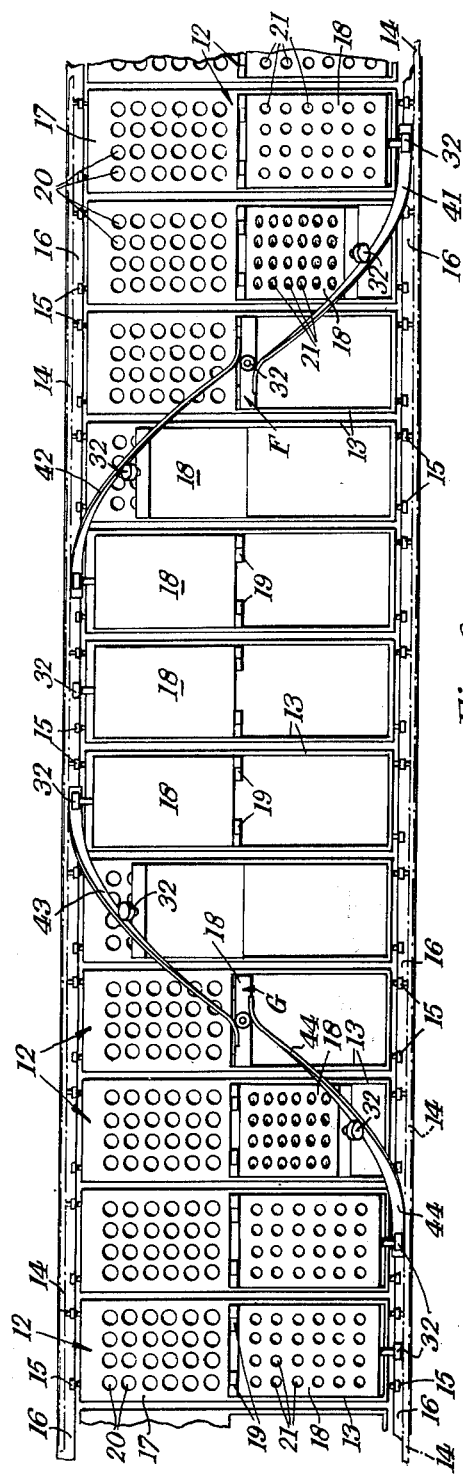
Figure 9:
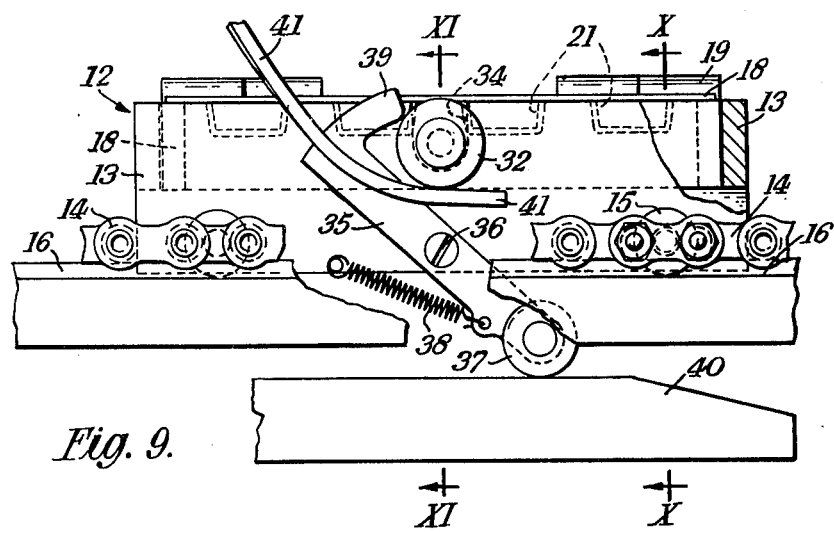
Figure 10:
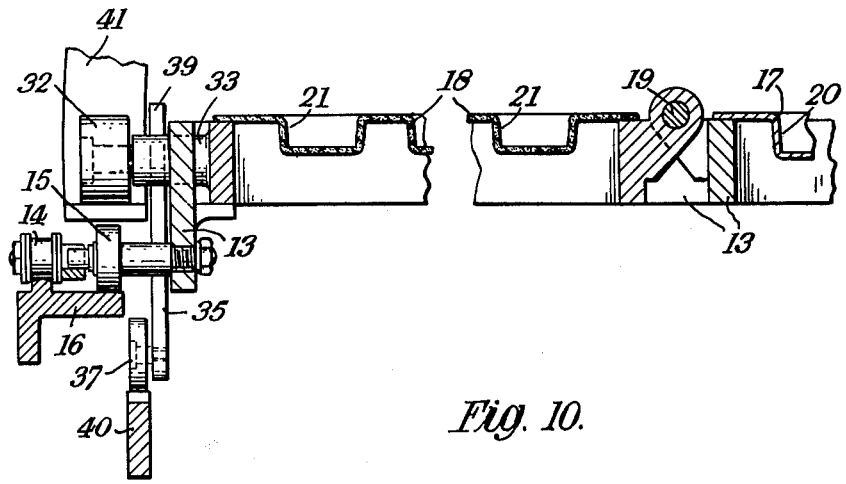
Figure 11:
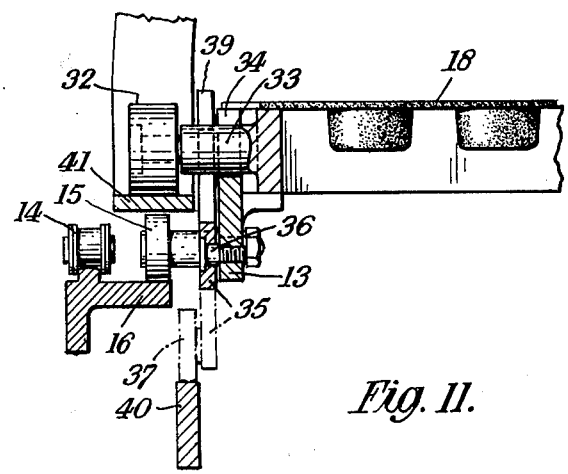

Two embodiments of the invention are illustrated, by way of example, in the accompanying drawings. Both embodiments have identical mould folding and unfolding mechanisms and they differ only in respect of the general layout of the apparatus. In the drawings:

FIGS. 1 to 4 are cross-sectional views of a mould showing successive stages in the moulding and demoulding procedure, FIG. 5 is a diagrammatic side elevation showing the first embodiment, FIG. 6 is a similar view of the second embodiment, FIG. 7 is a side elevation of the mould folding and unfolding mechanism, FIG. 8 is a corresponding plan view, FIG. 9 is a side elevation showing a mould approaching the folding station, FIG. 10 is a section on the line X—X in FIG. 9, and FIG. 11 is a section on the line XI—XI in FIG. 9.

Figure 2:
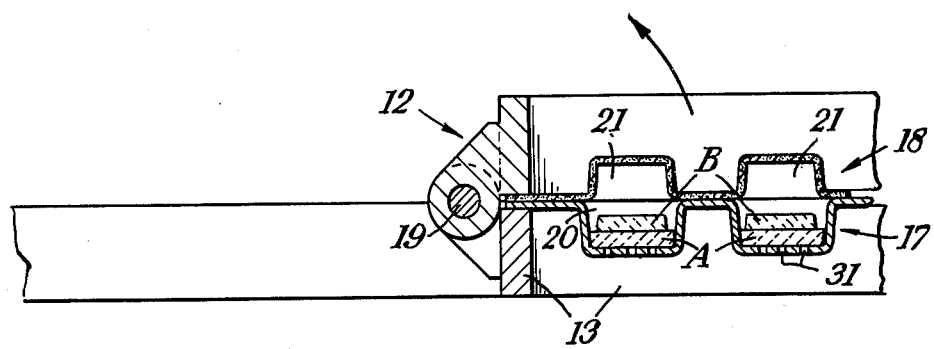

In both embodiments the apparatus includes a series of moulds 12, each consisting of a frame 13 (FIGS. 9 and 10) connected at each end to a continuously moving conveyor chain 14 and carrying at each end a pair of rollers 15 which run on a fixed rail 16. Each mould is divided into two halves, namely a fixed half 17 (FIG. 8) which is integral with the frame 13 and a hinged half 18, which is normally disposed within a recess in the frame 13 aligned with the fixed half as shown in FIG. 1 but which can be folded about a hinge 19 so that it can be laid flush on the fixed half as shown in FIG. 2. The mould halves 17, 18 are formed with mould cavities 20, 21 respectively.

In operation of the apparatus, and as described in more detail later, different materials A and B (for example cream and pectin jelly) are deposited simultaneously in the mould cavities 20 and 21 of each mould as indicated in FIG. 1. After the mould has travelled sufficiently far for the contents of the mould cavities to have cooled and solidified in a cooling zone, the hinged mould half 18 is folded down on top of the fixed mould half 17 as shown in FIG. 2 to deposit the material B in the cavities 21 on top of the material A in the cavities 20.

Such deposition may be assisted by blowing air through minute holes in the bases of the cavities 21 as described in British Specification No.1050699 or by tapping as described in British Specification No.1005674. Alternatively the cavities 21 may contain deformable membranes, as described in British Specification No.532873, which are normally retained within the cavities by application of vacuum but are allowed to contract to eject the filling by release of the vacuum after folding of the mould.

After such deposit the hinged mould half 18 is folded back to its initial position as shown in FIG. 3. If desired, a third material C for example fudge, can then be introduced into the cavities 20, this acting to weld together the materials A and B. Following this, the moulds are inverted and the contents of the cavities 20 are discharged on to a discharge conveyor 22, as shown in FIG. 4.

Apart from the hinged construction of the moulds and the provision of mould folding and unfolding mechanism the apparatus in both embodiments operates as described in British Specification No.1050699, which describes in detail parts of the apparatus other than the mould folding and unfolding mechanisms.

In the embodiment shown in FIG. 5, the moulds 12, after having discharged their contents on to conveyor 22, pass in succession past a spray unit 23 which sprays release agent into the cavities 20 and then beneath a moving head depositor 24 of the kind described in British Specification No.405374 which deposits the materials A and B in the mould cavities as shown in FIG. 1. After passage through a cooler 25, of the construction described in British Specification No.1005674, the mould reaches a folding zone D described in detail below and at which the mould is folded as shown in FIG. 2. Beyond this is a mechanical tapping device 29, which taps the upwardly facing surface of the folded half 18 of the mould to assist in discharging the material B into the cavities 20. The mould then passes through an unfolding zone E, described in detail below, in which the hinged half 18 is returned to its original position aligned with the fixed half 17. It then passes beneath a further moving head depositor 26 which deposits the third material C (FIG. 3) in the cavities 20 of its fixed half 17 and back to the cooler 25. The mould then passes through a turnover unit 27, which inverts it and then beneath a pneumatic discharge unit 28, which discharges the confections from the cavities 20 on to the conveyor 22 (see also FIG. 4). The units 27, 28 are as described in British Specificiation No.1050699.

The apparatus shown in FIG. 6 differs in that the second depositor 26 immediately follows the cooler 25 and deposits jam, or some other material suitable for bonding the materials A and B together, in the recesses 20 of the fixed mould half before the mould is folded, and in that the mould passes, after leaving the unfolding zone D, beneath a tamping unit 30 which presses the two halves of the mould together. From this the mould passes directly to the turn-over unit 27.

The forms of apparatus just described are suitable when the fixed halves 17 of the moulds are of metal and the hinged halves are of flexible material, e.g. silicone rubber. A release agent is therefore applied to the recesses 20 in the fixed half only, a mechanical tapping unit 29 is used to deform the flexible half during the first demoulding operation when the mould is closed (FIG. 2) and a pneumatic discharge unit 28 which applies air pressure to minute holes 31 (FIG. 4) in the bases of the cavities 20 of the inverted moulds is used for the second demoulding operation.

As an alternative the hinged halves of the moulds could be of metal and demoulded by air pressure and the fixed halves of flexible material and demoulded mechanically, in which case release agent would be applied to the cavities in the hinged halves. Obviously both halves may be of rigid material and demoulded by air pressure or of flexible material and demoulded mechanically.

Folding and unfolding of the moulds is accomplished as will now be described with reference to FIGS. 7–11.

Each hinged mould half 18 carries a roller 32 which, as shown most clearly in FIG. 11, is rotatable in a fixed boss 33 which projects from the mould half 18 through a slot 34 in the frame 13. The hinged mould half 18 is nornally held in the unfolded position flush with the fixed mould half by a latch 35, pivoted by a pin 36 to the frame 13 and carrying at its lower end a roller 37. A spring 38, extending between the latch 35 and the frame 13, normally holds the hook shaped upper end 39 of the latch in engagement with the boss 33.

As the mould approaches the folding station, the roller 37 encounters a cam rail 40, which rocks the latch 35 counterclockwise as seen in FIG. 9 to disengage it from the boss 33, and the roller 32 engages a lifting rail 41. As the mould proceeds, to the left as seen in FIG. 8, the rail 41 progressively lifts its hinged half 18 through the agency of the roller 32 until it reaches the vertical position as indicated at F. The roller 32 then leaves the lifting rail 41 and comes under control of a lowering rail 42, which permits the hinged portion 18 to descend gradually under gravity to the folded position shown in FIG. 2.

After demoulding from the cavities 21 has taken place as already described, the roller 32 encounters a second lifting rail 43, which gradually lifts the hinged mould half to the vertical as shown at G, and then a second lowering rail 44 which allows it to return gradually under gravity to its original horizontal position, in which it is re-locked by engagement of the latch 35 with the boss 33.

The materials introduced into the cavities 20, 21 by the depositor 24 may be basically different confections, e.g. cream and pectin jelly as described above. Alternatively they may be the same basic confection but of different colour or flavour.

What I claim as my invention and desire to secure by letters patent is:

1. Apparatus for moulding confectionery, comprising an endless conveyor, a series of moulds, each of which is divided into a first half attached to the conveyor and a second half which is hinged to and normally aligned with the first half, said conveyor carrying the moulds in sequence past a filling station, through a cooling zone to a folding station, then to an unfolding station and then to a discharge station and back to the filling station, a depositor at the filling station which is arranged to deposit different materials into moulding cavities in each half of each mould, mechanism disposed at the folding station for folding the second half of each mould about its hinge against the first half and effecting deposition of the contents of the moulding cavities thereof into the moulding cavities of the first half, mechanism disposed at the unfolding station for returning the folded second half of each mould into alignment with its first half, and means for inverting the moulds prior to arrival at the discharge station and turning them to cause their moulding cavities to face upwardly during their return to the filling station.

2. Apparatus according to claim 1, which includes a further depositor situated between the unfolding station and the discharge station and arranged to deposit a third material into the moulding cavities of the fixed halves only of the moulds, and in which the moulds are arranged to traverse the cooling zone again after leaving the further depositor.

3. Apparatus according to claim 1, which includes a further depositor situated between the cooling zone and the folding station and arranged to deposit a third material into the moulding cavities of the fixed halves only of the moulds.

4. Apparatus according to claim 1, in which each mould includes a framework attached at its ends to parallel conveyor chains and carrying at its ends rollers which run on supporting rails, the framework having a recess for accommodation of the second mould half in a position aligned with the first mould half.

5. Apparatus according to claim 4, in which the second half of each mould carries, at the end remote from the first half, a roller which projects from the framework and which includes, both at the folding station and at the unfolding station, a lifting rail which coacts with the rollers on the second mould halves to raise said mould halves to a vertical position followed by a lowering rail which coacts with the rollers to guide said mould halves into a horizontal position.

6. Apparatus according to claim 5, in which the framework of each mould carries a pivoted latch which is biased to engage a projection on the second mould half to latch it in its position aligned with the first mould half and which includes at the folding station a cam rail which cooperates with the latches to move them clear of the projections and so to permit folding of the moulds.

* * * * *